Jan. 18, 1938.                J. P. HODGE                2,105,735
                      PRESSURE RELEASING APPARATUS
                        Filed Oct. 10, 1935            2 Sheets-Sheet 1

INVENTOR
JAMES P. HODGE
BY Paul, Paul & Moore
ATTORNEYS

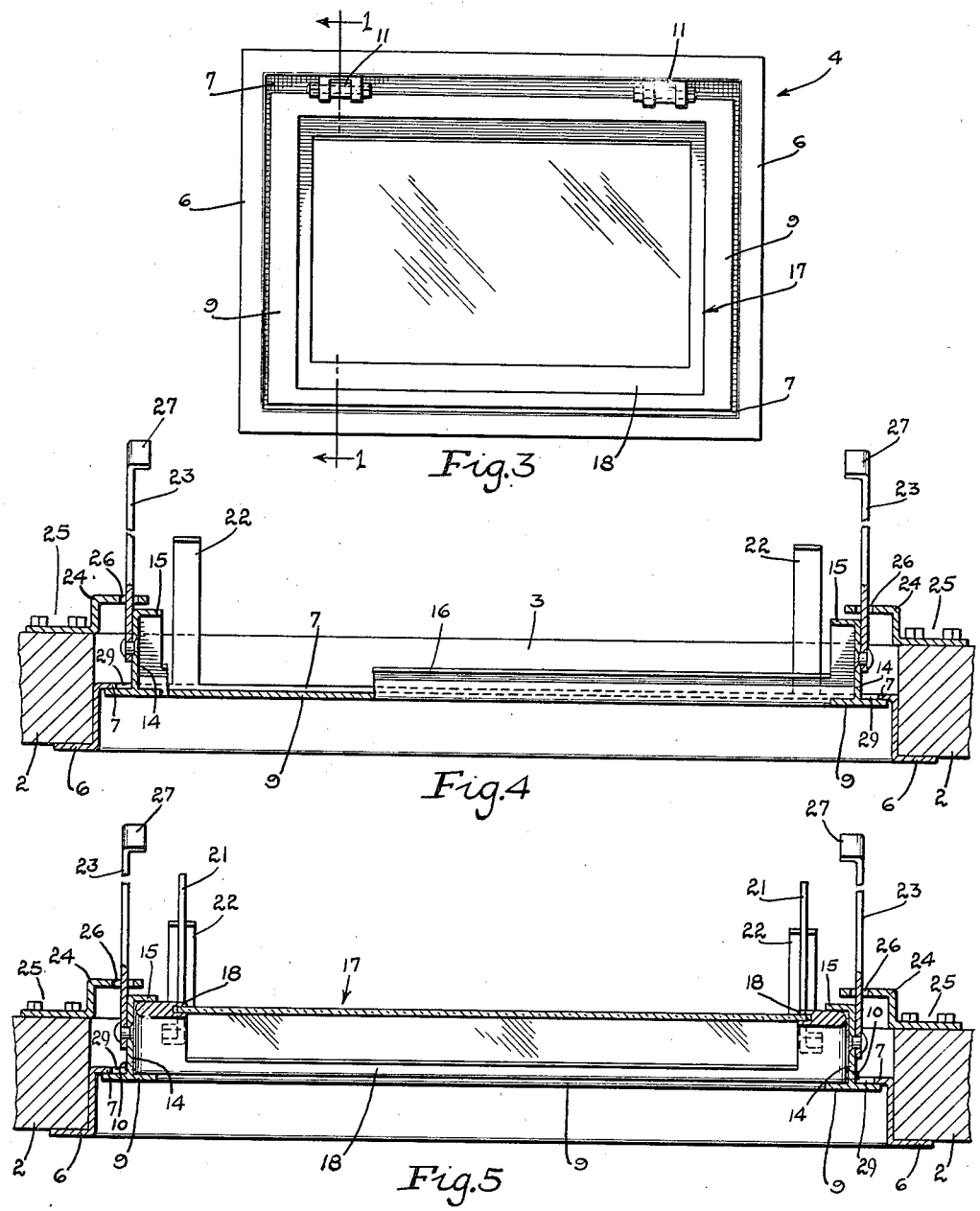

Patented Jan. 18, 1938

2,105,735

UNITED STATES PATENT OFFICE 2,105,735

PRESSURE RELEASING APPARATUS

James P. Hodge, Amarillo, Tex., assignor to General Mills, Inc., Minneapolis, Minn., a corporation of Delaware Application October 10, 1935, Serial No. 44,440

14 Claims. (Cl. 189—71)

This invention relates to new and useful improvements in pressure releasing apparatus, and more particularly to an apparatus adapted for use in connection with a closed chamber to permit the escape of abnormal pressures therefrom, should an abnormal pressure suddenly develop therein.

The present application is a continuation in part of my application, Serial Number 13,721, filed March 29, 1935, and allowed April 19, 1935.

Serious damage may readily be imparted to permanent structures or buildings, by the sudden development within the structure, of an excessively high pressure, such as may be caused by an explosion, particularly if the explosion occurs within a closed chamber or room as, for example, in a grain bin, where no means are provided for instantly releasing from the room, the pressure so developed therein. In grain storage bins, the danger of explosions from spontaneous combustion is often present, because of the inherent nature of the material.

The present invention pertains more particularly to an apparatus adapted to be embodied in the wall structure of a closed chamber or bin, which is so constructed that upon the initial force of an explosion within the chamber, said device is automatically opened to provide an adequate outlet for the pressure in the chamber, whereby the force of the explosion is instantly dissipated without damaging the walls or any other portion of the permanent structure or bin.

An important object of the invention, therefore, is to provide a pressure releasing apparatus adapted for use in connection with a closed chamber as, for example, a grain bin, for automatically releasing excessive pressures therefrom, in the event of an explosion, and whereby damage to the permanent structure from such causes may be avoided.

A further object is to provide in combination with a closed chamber having an opening in a wall thereof provided with a closure, and means for locking said door in closed position, a pressure responsive member operatively associated with said locking means and adapted, upon abnormal pressure in the chamber, to actuate the locking means and thereby effect the release of the closure, whereby the pressure may escape to the atmosphere.

A further object is to provide a closed chamber having an opening in a wall thereof provided with a closure, and means for locking the closure in closed position, said locking means comprising a fixed member and a relatively movable member adapted to lockingly engage said fixed member, and a pressure responsive device operatively associated with the locking means and adapted, upon abnormal pressure in the chamber, to operate the locking means and effect the release of the closure, whereby the pressure in the chamber may be quickly released to the atmosphere.

A further object is to provide a self-opening window comprising a frame adapted to be suitably secured in an opening in a wall, and having a frame pivotally supported therein, and a panel being movably supported in said pivoted frame and having means for locking the pivoted frame in its normal closed position, and said panel being adapted to be relatively moved in the pivoted frame by excessive pressures within the structure, to thereby effect the release of the pivoted frame, whereby said frame and panel may be swung outwardly to an open position to thereby permit the pressure within the chamber to quickly escape therefrom.

A further object is to provide a self-opening window comprising a frame adapted to be pivotally suspended in a window opening, and having a panel pivotally supported in said frame and adapted for limited swinging movement, said panel carrying a latch member adapted to lockingly engage a fixed member, when the frame is in normal closed position, thereby to secure the frame in such position, and said panel being so arranged in the frame that upon the sudden development of an abnormal pressure within the chamber or structure, a portion of said panel is swung outwardly, whereby said latch member is operated to effect the release of the pivoted frame, and whereby the latter and the panel may be swung outwardly to an open position by the force of the pressure within the chamber, means being provided for holding the pivoted frame in open position to thereby permit the pressure within the structure to escape therefrom.

Other objects reside in the particular arrangement and construction of the various parts of the apparatus, whereby it may be conveniently embodied in the construction of a wall in much the same manner as an ordinary window; in the particular manner of pivotally supporting the swinging frame in the upper portion of the fixed frame; in the simple manner of pivotally supporting the panel in the pivoted frame, whereby it is normally retained in an inclined position, and whereby the upper portion of said panel may readily be swung outwardly to operate the latch member, thereby to effect the release of the pivoted frame; and in the simple means provided for retaining the pivoted frame and panel in open position, when once the apparatus has been actuated or swung outwardly by an abnormal pressure within the structure.

The outstanding feature of the invention, therefore, is to provide a safety window or closure for a closed bin or chamber, adapted to automatically open, upon an abnormal pressure in the bin or chamber, whereby the pressure may be quickly released therefrom without causing any damage to the building or permanent structure.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 3 is an exterior view of the apparatus when in normal closed position;

Figure 4 is a sectional plan view on the line 4—4 of Figure 1, with the panel removed therefrom; and Figure 5 is a similar view showing the panel in its normal position in the pivoted frame.

Figure 1:
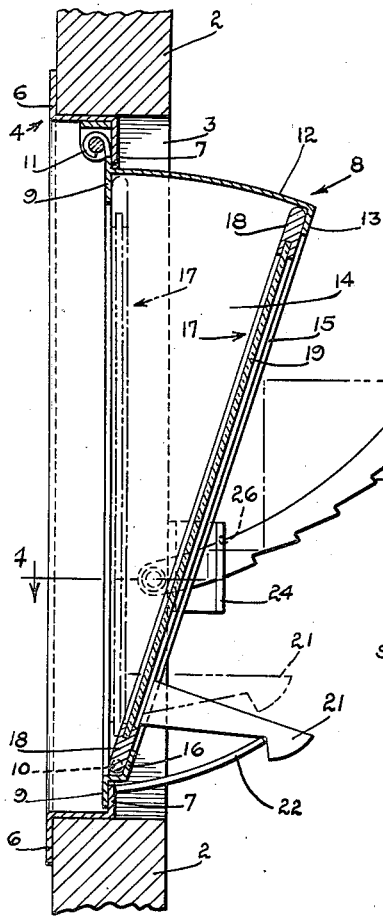
Figure 1 is a vertical sectional view on the line 1—1 of Figure 3, showing the pivoted frame and the panel in their normal closed positions.

In the selected embodiment of the invention here shown, there is illustrated, for purposes of disclosure, a portion of a wall 2, which, for purposes of explanation, may represent a wall of a grain bin, although it is to be understood that the invention may be used in connection with various other structures or apparatus, where applicable.

A suitable opening 3 is provided in the wall 2 and in this opening, a suitable frame, generally indicated by the numeral 4 is suitably secured. This frame, as clearly illustrated in the drawings, comprises a portion 5 adapted to be fitted in the opening 3 and having an outwardly projecting flange 6 adapted to be seated against the outer surface of the wall 2 around the opening 3, and whereby the frame 4 may conveniently be secured in place.

The frame 4 also has an inwardly projecting flange 7 which, in the present instance is shown located in substantially the medial plane of the wall 2, although it is to be understood that the location of this flange may be varied in accordance with the wall structure. The inwardly projecting flange 7 provides a seat for a pivoted frame, generally indicated by the numeral 8, and which will next be described.

Figure 2:
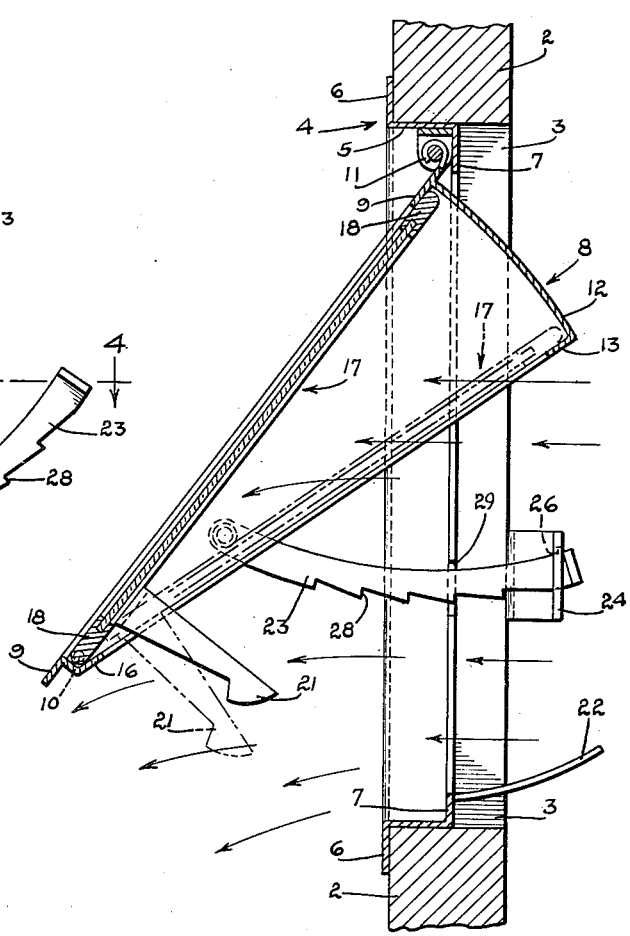
Figure 2 is a similar view showing the positions of the frame and panel, when forced outwardly to open positions by the force of an explosion, or other abnormal pressure within the structure.

The frame 8 comprises a web or flanged portion 9 adapted to be seated against the inwardly turned flange 7 of the frame 4. Suitable hinges 11 secure the upper portion of the flange 9 in the frame 4, as best shown in Figures 1, 2, and 3, and whereby the frame 8 may swing outwardly from the position shown in Figure 1 to that shown in Figure 2. The frame 8 is shown substantially triangular in vertical cross-section, as best shown in Figures 1 and 2, and has an upper wall portion 12 which may be arcuately formed, as shown in Figures 1 and 2. This top wall extends from the web or flange 9 in an inward direction and terminates in a downwardly extending flange 13. Walls 14 constitute the ends of the frame 8, and these walls have inwardly turned portions 15 cooperating with the flange 13 of the upper wall 12 to provide an annular seat for a glazed panel, subsequently to be described. The lower upstanding flange 16 is disposed in the plane of the flange 13 and the inwardly turned portions 15 of the frame 8, and cooperate therewith to provide an annular seat, as clearly illustrated in Figures 1 and 2.

Pivotally supported within the frame 8 is a panel, generally indicated by the numeral 17, and shown comprising a rectangular frame 18, in which is secured a glazed panel 19, which functions as a window to admit light into the bin or chamber. The panel 17 has its lower edge supported between the horizontal upright flange 16 of the frame 8 and the vertical flanges 9 at the sides thereof, which flanges are spaced apart at the lower portion of the frame 8 to provide a seat for the lower edge of the panel, whereby the latter may readily be swung outwardly to the dotted line position, shown in Figure 1. Suitable pivots 10 may be provided, if necessary, to support the lower edge of the panel 17. The swinging movement of the upper edge of the panel 17 is limited by the horizontal flanges 9 and 13 of the frame 8, as will be clearly understood by reference to Figures 1 and 2.

Means is provided for locking the frame 8 in its normal closed position, as shown in Figure 1, and may consist of suitable latch members 21, shown secured to the panel 17 and having their terminals adapted to engage fixed stop members 22, suitably secured to the fixed frame 4 as, for example, by welding or riveting. When the frame 4 is in its normal position, as shown in Figure 1, the panel 17 will move inwardly by the force of gravity, to the full line position against the stop 13, whereby the latch members 21 are moved into locking engagement with the ends of the stop members 22, as clearly illustrated in full lines in Figure 1. When the panel is swung outwardly from the full to the dotted line position, shown in Figure 1, the latch members 21 are moved out of locking engagement with the stop members 22, whereby the pivoted frame 4 is released, and may then be readily swung outwardly by the force of an explosion within the chamber or bin.

Means is also provided for locking the frame and panel in their normal open positions, as shown in Figure 2. Such means may consist of a pair of toothed members or bars 23, each having one end pivotally secured to the end walls 14 of the frame 8, and having their opposite ends loosely supported in fixed brackets 24, shown suitably secured to inner surfaces of the wall 2, as indicated at 25 in Figures 4 and 5. The inner ends of the bars 23 are shown movably received in suitable slots or openings 26 provided in the brackets 24, and have offset terminals 27 adapted to engage the brackets 24, when the window is swung outwardly to thereby limit the outward movement of the frame 8 and panel 17. Suitable teeth 28 are shown provided on the lower edges of the bars 23 adapted to lockingly engage the lower walls of the slots 26 of the brackets 24, to thereby retain the window structure in open position, as clearly illustrated in Figure 2. The vertical portions of the inwardly turned flanges 7 are shown provided with suitable notches 29 to provide clearance for the toother bars 23, as will readily be understood by reference to Figures 2 and 4.

The novel window structure, herein disclosed, has been found very useful in the construction of grain bins, as it provides a positive means for quickly releasing abnormal pressures therefrom, which may result from such causes as spontaneous combustion. The frame 8 cannot be opened from the exterior of the building, as will readily be understood by reference to Figures 1, 2, and 3, of the drawings. Because of the particular arrangement of the panel 17 and the means associated therewith for locking the frame 8 in closed position, when an abnormal pressure is suddenly developed within the bin, the panel 17, because of the large area thereof which is exposed to the pressure within the bin, is immediately swung outwardly to the dotted line position, shown in Figure 1, whereby the frame 8 is released, and may then be quickly swung outwardly by the first force of the explosion, as clearly illustrated in Figure 2, whereby the initial force of the explosion is instantly spent or dissipated to the atmosphere, with the result that no damage is imparted to the permanent structure.

When once the frame 8 and panel 17 have been swung outwardly to permit the escape of the pressure within the bin, they are retained in such positions by the toothed bars 23 to thereby permit all of the gases to escape from the bin. The structure may be quickly closed by manually lifting the bars 23 out of locking engagement with the brackets 24, whereupon the frame 8 will swing into its normal closed position by gravity, and the latches 21 of the panel 17 will lockingly engage the stops 22, as shown in Figure 1.

I claim as my invention:

1. A chamber having an opening in a wall thereof, means normally closing said opening and comprising a movable frame, means for locking the frame in closed position, and a panel movably supported in said frame and having an operative connection with the locking means and adapted, upon abnormal pressure in the chamber, to actuate said locking means and effect the release of the frame.

2. A chamber having an opening in a wall thereof, means normally closing said opening comprising a movable frame, means for positively locking the frame in closed position, and a member movably supported in said frame and having an operative connection with the locking means and adapted, upon abnormal pressure in the chamber, to actuate said locking means and effect the release of the frame.

3. A chamber having an opening in a wall thereof, a pivoted sash normally closing said opening, means for locking the sash in closed position, and a member movable with the sash and having an operative connection with the locking means, said member being adapted, upon abnormal pressure in the chamber, to actuate the locking means and effect the release of the sash.

4. A chamber having an opening in a wall thereof, means normally closing said opening comprising a pivoted frame, means for locking the frame in closed position, and a panel pivotally supported in the frame and having an operative connection with the locking means and adapted, upon abnormal pressure in the chamber, to actuate the locking means and thereby effect the release of the frame.

5. A chamber having an opening in a wall thereof, means normally closing said opening comprising a frame mounted for relative movement therein, a panel movably supported in said frame, means for locking the frame in closed position, and said panel being adapted, upon abnormal pressure in the chamber, to relatively move in said frame and effect the release of the locking means, whereby the frame may be moved to an open position to release the pressure from the chamber.

6. A chamber having an opening in a wall thereof, means normally closing said opening comprising a frame mounted for pivotal movement therein, and a panel movably supported in said frame and having means for normally locking the frame in closed position, said panel being adapted upon abnormal pressure in the chamber to effect the release of the frame, whereby the latter may be swung to an open position to release the pressure from said chamber.

7. A chamber having an opening in a wall thereof, means normally closing said opening comprising a frame mounted for pivotal movement, and a panel mounted for swinging movement in said frame and having means for normally locking the frame in closed position, said panel being adapted, upon abnormal pressure in the chamber, to relatively move in said frame and thereby effect the release of the frame, whereby the latter may be swung outwardly to an open position to release the pressure from the chamber.

8. A chamber having an opening in a wall thereof, means normally closing said opening comprising a frame mounted for pivotal movement, a panel pivotally supported in said frame, and a latch member movable with the panel and normally locking the frame in closed position, said panel being adapted, upon abnormal pressure in the chamber, to operate the latch member, and thereby effect the release of the frame.

9. A chamber having an opening in a wall thereof, means normally closing said opening comprising a frame mounted for pivotal movement therein, a panel pivotally supported in said frame, a latch member movable with the panel and normally locking the frame in closed position, said panel being adapted, upon abnormal pressure in the chamber, to relatively tilt in the frame and thereby operate the latch member, whereby the frame is released and may be swung outwardly to thereby release the pressure from the chamber.

10. In a self-opening window for grain bins, a frame permanently mounted in an opening in a wall of the grain bin, a frame pivotally supported in the upper portion of said fixed frame, a panel mounted for swinging movement in said pivoted frame and normally inclined inwardly and engaged with an annular seat, means on the panel for locking the pivoted frame in its normal closed position, said panel being adapted to be relatively tilted in said pivoted frame by an abnormal pressure within the bin, whereby said locking means is operated to effect the release of the pivoted frame, and whereby the latter and said panel may be swung outwardly to an open position to release the pressure from the bin.

11. In a self-opening window for grain bins, a frame pivotally mounted in an opening in a wall of the grain bin, a glazed panel mounted for swinging movement in said frame and normally inclined inwardly and engaged with an annular seat, a latch member secured to the panel and normally engaged with a fixed stop, whereby said pivoted frame and panel are secured in closed position, said panel being adapted to be relatively tilted in said pivoted frame by an abnormal pressure within the bin, whereby the latch member is moved out of locking engagement with said fixed stop to thereby effect the release of the pivoted frame, and whereby said pivoted frame and panel may be swung outwardly to an open position to release the pressure from the bin.

12. In a self-opening window for grain bins, a frame mounted in a wall opening and having means at its upper portion for pivotally supporting it therein, the upper portion of said frame extending inwardly and comprising end walls and a top wall, a glazed panel mounted in said frame and adapted for relative swinging movement therein, means normally locking the frame in closed position, said locking means being actuated by relative movement of said panel in said frame, whereby when the panel is swung outwardly by an abnormal pressure in the bin, said locking means is operated to effect the release of the pivoted frame, whereby the latter and said panel may be swung outwardly to an open position to release the pressure from the bin.

13. In a self-opening window for grain bins, a frame mounted in a wall opening and having means at its upper portion for pivotally supporting it therein, the upper portion of said frame extending inwardly and comprising end walls and a top wall, a glazed panel mounted in said frame and adapted for relative swinging movement therein, means normally locking the frame in closed position, said locking means being actuated by relative movement of said panel, whereby when the latter is swung outwardly by an abnormal pressure in the bin, said locking means is operated to effect the release of the pivoted frame, whereby the latter and said panel may be swung outwardly to an open position to release the pressure from the bin, and means for holding the frame and panel in open position to permit all of the pressure to escape from the bin.

14. In a self-opening window for a closed chamber, a frame mounted in a wall opening and having its upper portion pivotally supported therein, whereby the lower portion of the frame may be swung outwardly, said frame being substantially triangular in vertical cross-section and having its upper portion extending inwardly and provided with end walls and a top wall, a panel mounted for pivotal movement in said frame and normally disposed in an inclined position in engagement with an annular seat in said frame, a latch member on the lower portion of said panel normally engaged with a fixed stop to thereby secure the frame against swinging movement, said panel being adapted to be relatively tilted in said frame, when subjected to an abnormal pressure from within the chamber, whereby the latch member is operated to effect the release of the pivoted frame, and whereby said frame may be swung outwardly to an open position to permit the pressure in the chamber to quickly escape therefrom.

JAMES P. HODGE.